US005727829A

United States Patent [19]
Bellichak

[11] Patent Number: 5,727,829
[45] Date of Patent: Mar. 17, 1998

[54] COMBINED SHOVEL AND BROOM

[76] Inventor: Deval Bellichak, 315H Bottomley Ave., S., Saskatoon, Saskatchewan, Canada, S7N 1K8

[21] Appl. No.: 726,936

[22] Filed: Oct. 7, 1996

[51] Int. Cl.⁶ .............................. A01B 1/20; E01H 5/02
[52] U.S. Cl. .......................... 294/51; 15/111; 294/53.5; 294/54.5
[58] Field of Search .................. 294/49, 51, 52, 294/53.5, 54.5; 7/114–116; 15/105, 111, 114, 117, 144.1, 236.02; 37/241, 265, 267, 285; 56/400.04–400.06; 403/93, 94, 96, 103, 104

[56] References Cited

U.S. PATENT DOCUMENTS

| | | | |
|---|---|---|---|
| 624,310 | 5/1899 | Eck | 15/111 |
| 877,614 | 1/1908 | Thompson. | |
| 1,261,859 | 4/1918 | Seiter | 294/53.5 |
| 1,402,485 | 1/1922 | Fredriksen et al. | 15/111 |
| 1,478,204 | 12/1923 | Cooney et al. | 294/51 |
| 1,511,073 | 10/1924 | Gampher | 37/285 X |
| 1,810,026 | 6/1931 | Moller | 294/51 |
| 2,090,412 | 8/1937 | Greiger | 15/111 X |
| 2,126,023 | 8/1938 | McGoldrick. | |
| 2,867,827 | 1/1959 | Gantz. | |
| 3,473,838 | 10/1969 | Rankin | 294/53.5 |
| 3,733,636 | 5/1973 | Osadsky. | |
| 4,346,928 | 8/1982 | Towsend. | |
| 5,123,138 | 6/1992 | Flamm | 15/111 |

*Primary Examiner*—Johnny D. Cherry
*Attorney, Agent, or Firm*—Murray E. Thrift; Adrian D. Battison

[57] ABSTRACT

The present invention provides a combined shovel and broom having a pivoting shovel blade for selectably choosing one of a shoveling position and a brushing position. The combined shovel and broom is simple and allows the shovel portion and the broom portion to be used easily and without interfering with each other. The combined shovel and broom comprises a shovel blade having a shoveling edge and a brush head, a handle, a pivot connection, and a catch for securing the handle in various shovelling and brushing positions.

14 Claims, 3 Drawing Sheets

COMBINED SHOVEL AND BROOM

FIELD OF THE INVENTION

The present invention provides a combined shovel and broom, particularly of the type with a pivoting shovel blade for selectably choosing one of a shoveling position and a brushing position.

BACKGROUND

When shoveling grain, soil, snow, and many other materials, it is often desirable to sweep off the ground or other supporting surface either during or after shoveling. To do this, it is necessary to employ both a shovel and a broom, and requires carrying both the shovel and broom to the work area, then switching between the shovel and the broom as the work is done. This can be inconvenient and time consuming.

Attempts have been made in the past to provide a practical combined shovel and broom. In these earlier attempts the shovel portion and the broom portion often interfered with each other such that neither one worked well. A second problem with this type of device is that the means for switching between the shovel and the broom has often been too intricate and complicated and not robust enough to work well.

A combined shovel and broom is needed which is simple and which allows the shovel portion and the broom portion to be used easily and without interfering with each other.

SUMMARY

According to the present invention there is provided a combined shovel and broom comprising:

a shovel blade having a concave front face, a laterally extending shoveling edge and a laterally extending brush edge;

a brush head along the laterally extending brush edge of the shovel blade;

an elongate handle;

pivot connection means pivotally mounting the handle on the shovel blade for pivotal movement of the handle relative to the blade between a shoveling position with the handle sloping to a front of the blade towards the shoveling edge and a brushing position with the handle sloping to a front of the blade towards the brush edge; and catch means for selectively locking the handle in the shoveling position and the brushing position.

When the shovel blade is in the brushing position, the brush head lies in front of the rest of the shovel blade allowing the user to sweep without the shovel blade interfering with the user's ability to see in front of the brush head, and without the shovel blade interfering with objects in front of the brush head. When the shovel blade is in the shoveling position, the brush head lies above the rest of the shovel blade and out of the way allowing the user to shovel without the brush head interfering.

The pivot connection means are simple and robust and comprise a hole in the handle near a first end thereof, and a pair of spaced apart flanges fixed to the back side of the shovel blade for receiving the first end of the handle therebetween. The flanges are arranged substantially perpendicular to the lateral edges of the shovel blade. A pin member engages through the hole in the handle and is connected to the flanges, thereby pivotally connecting the elongate member between the flanges.

Catch means secure the shovel blade in one of the shoveling position, or the brushing position. The catch means is slidably arranged on the handle for engaging a plurality of notches in a top surface of the flanges and includes resilient means for biasing the catch means towards the shovel blade and into the notches.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
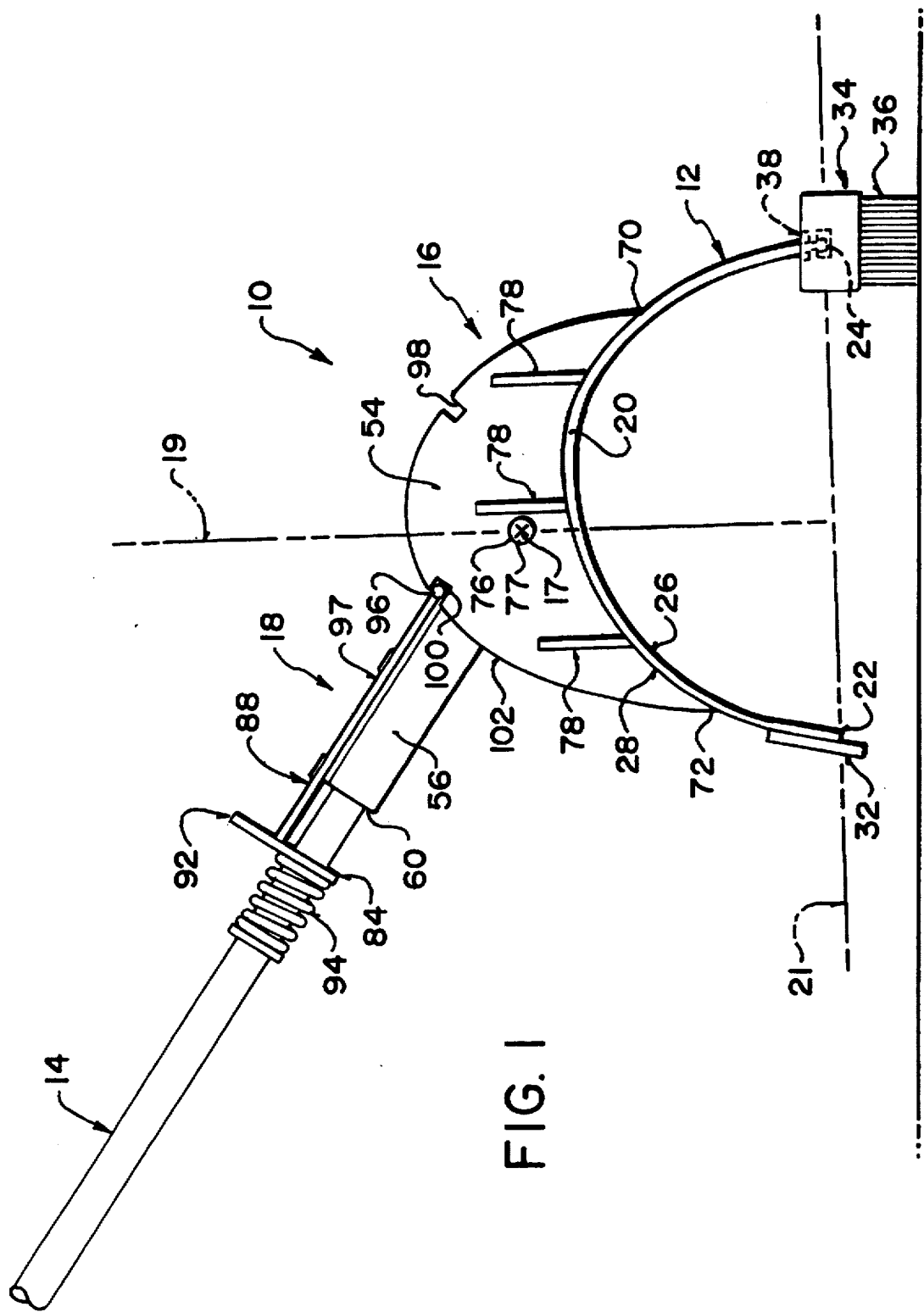
FIG. 1 is a side view of the combined shovel and broom in the brushing position.
Figure 2:
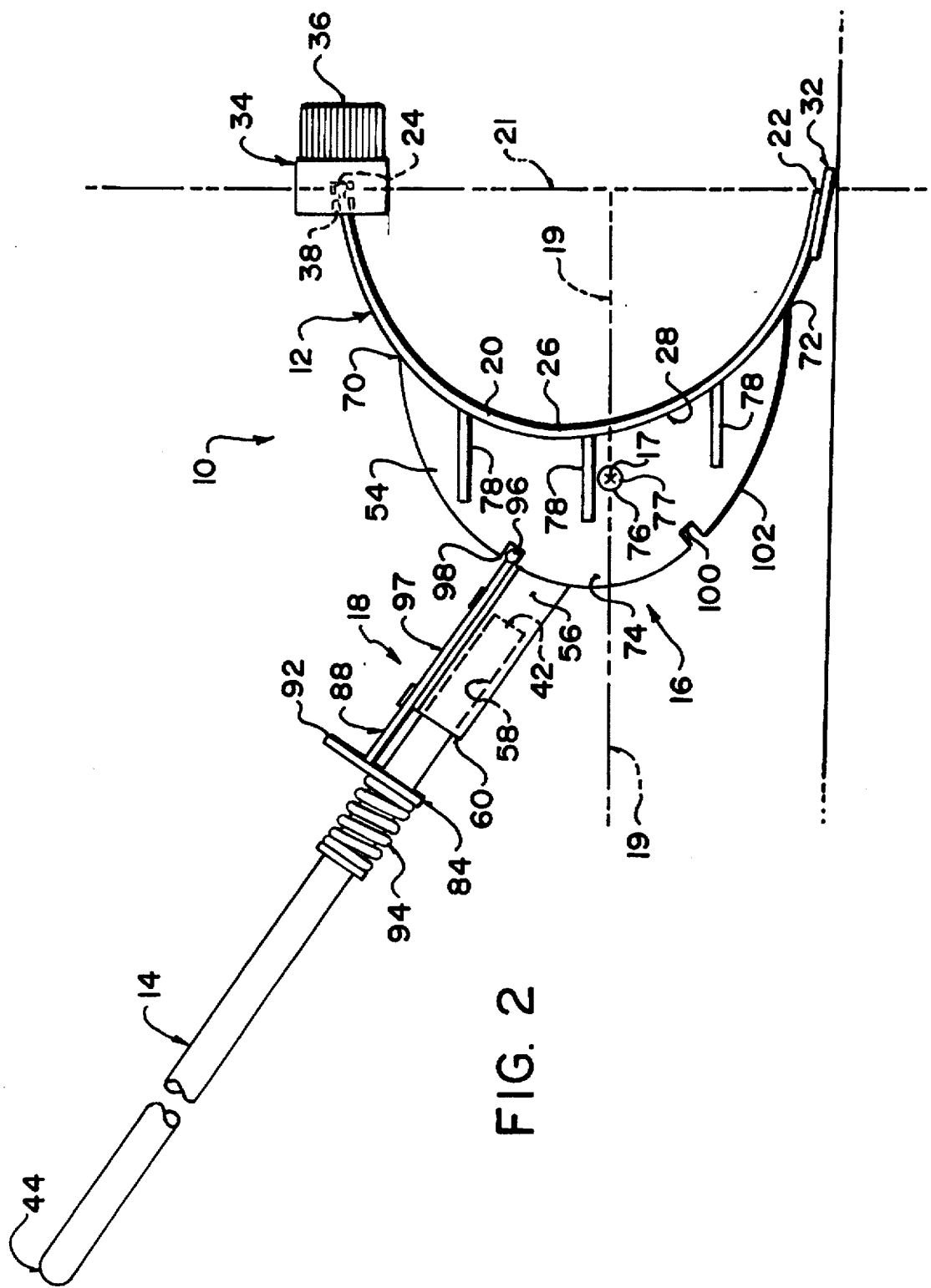
FIG. 2 is a side view of the combined shovel and broom in the shoveling position.
Figure 3:
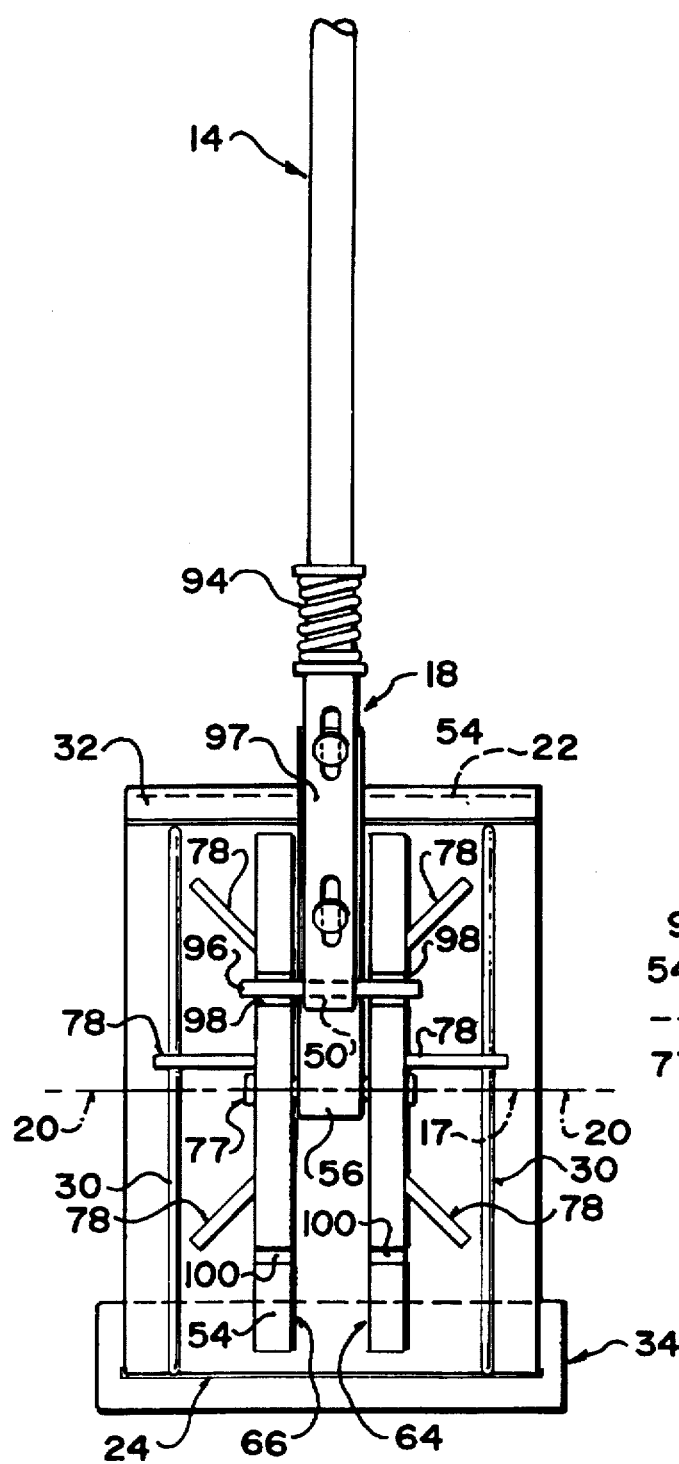
FIG. 3 is a top view of the combined shovel and broom in the brushing position.

Referring to FIGS. 1, 2 and 3 a preferred embodiment of the combined shovel and broom is shown generally at 10. The combined shovel and broom may be used in either a shoveling position or a brushing position and comprises a shovel blade 12 having a shoveling edge 22 and a brush head 34, a handle 14, a pivot connection 16, and a catch means 18.

The shovel blade 12 comprises a curved sheet of metal or plastics material which extends between two side edges 20 and has first and second lateral edges 22 and 24. The two side edges 20 lie in substantially vertical planes and the first and second lateral edges 22 and 24 extend between the side edges 20 substantially parallel to one another and to a horizontal plane. The first lateral edge 22 provides a shoveling edge and the second lateral edge 24 provides a brush edge. The shovel blade 12 has a concave front face 26 and a back side 28 and includes reinforcing ribs 30 extending between the shoveling and brush edges 22 and 24 to provide rigidity and strength to the shovel blade 12.

A scraping edge 32 is fixed along the shoveling edge 22 of the shovel blade 12 and is arranged for engaging the ground when the shovel blade 12 and handle 14 are in the shoveling position. The scraping edge 32 is a flat elongate strip of metal or other material which is hard enough to stand up to repeated contact with the ground or other surface.

A brush head 34 is fixed to the brush edge 24 of the shovel blade 12 and is arranged for engaging the ground or other surface when the shovel blade 12 is in the brushing position. The brush head 34 has bristles 36 on a first side and a slot 38 extending along a side opposite the bristles 36. The slot 38 is arranged to receive the brush edge 24 in an interference fit and thereby fixes the brush head 34 on the shovel blade 12.

The handle 14 comprises an elongate shaft which extends from a first end 42 adjacent the shovel blade 12 rearwards to a second end and is connected to the shovel blade 12 at the first end 42 by a pivot connection 16. The handle 14 includes an elongate member 56 arranged at its first end 42 having a receptacle 58 at an end 60 for receiving the first end 42 of the handle 14 therein and a hole 50 through opposing sides of the elongate member 56 adjacent an end opposite the receptacle 58.

The pivot connection 16 connects the back side 28 of the shovel blade 12 to the first end 42 of the handle 14 such that the blade 12 may be pivoted about a lateral axis of rotation 17 between the shoveling position and the brushing position.

When the handle 14 and shovel blade 12 are in the shoveling position, see FIG. 2, the handle 14 extends upwards and rearwards from the shovel blade 12, and is sloped to the front of the blade 12 towards the shoveling edge 22. This positions the handle 14 such that it would lie to a side nearest the brush head 34 of a line 19 which extends through the lateral axis of rotation 17 and perpendicular to a second line 21 extending between the shoveling edge 22 and the brush edge 24. In this position the front face 26 of the shovel blade 12 is concave forwards such that the scraping edge 32 is in contact with the ground or other surface, and the brush head 34 is located above the scraping edge 32 and out of the way.

When the handle 14 and shovel blade 12 are in the brushing position, see FIG. 1, the handle 14 angles upwards and rearwards from the shovel blade 12, and is sloped to the front of the blade 12 towards the brush edge 34. This positions the handle 14 such that it would lie to a side nearest the shoveling edge 22 of the line 19. In this position the front face 26 of the shovel blade 12 is concave downwards such that the brush head 34 is in contact with the ground or other surface. The shovel blade 12 curves upwardly and rearwardly from the brush head 34 to the scraping edge 32, with the scraping edge 32 positioned above the ground or other surface, and the brush head 34 is forward of the shovel blade 12 which allows the brush head 34 to be used for sweeping without having the shovel blade 12 get in the way when sweeping around or near objects. Having the shovel blade 12 extending rearwards also allows the user to see directly in front of the brush head 34.

The pivot connection 16 is fixed to a back side 28 of the shovel blade 12 for pivoting the handle relative to the shovel blade 14 about a lateral axis of rotation 17, and includes a pair of spaced apart flanges 54 and the hole 50 in the handle 14. The flanges 54 are fixed to the back side 28 of the shovel blade 12 such that they lie substantially perpendicular to the shoveling and brush edges 22 and 24 and are spaced apart from one another such that the elongate member 56 can be arranged between the flanges 54. The flanges 54 include cooperating faces 64 and 66 arranged to slidably engage respective sides of the elongate member 56. The faces 64 and 66 guide the elongate member 56 as it is pivoted between the flanges 54 and provide lateral support to the elongate member The flanges 54 are shaped such that they increase in height to an apex when moving from the ends 70 and 72 towards the center 74 of the flange 54. Each flange 54 has a hole 76 arranged laterally through it which is aligned with the hole 76 in the flange opposite. The aligned holes 76 cooperate with the hole 50 in the elongate member 56 to receive a pin member 77. The pin member 77 extends through the hole 50 in the elongate member 56 and the holes 76 in the flanges 54 thereby connecting the elongate member 56 between the flanges 54 such that the elongate member 56 can pivot between the flanges 54.

The flanges 54 include reinforcing members 78. Each reinforcing member 78 is fixed to an outer face of the flange 54 and extends therefrom to the shovel blade 12. Three reinforcing members 78 are provided for each flange 54 in this embodiment.

Figure 4:
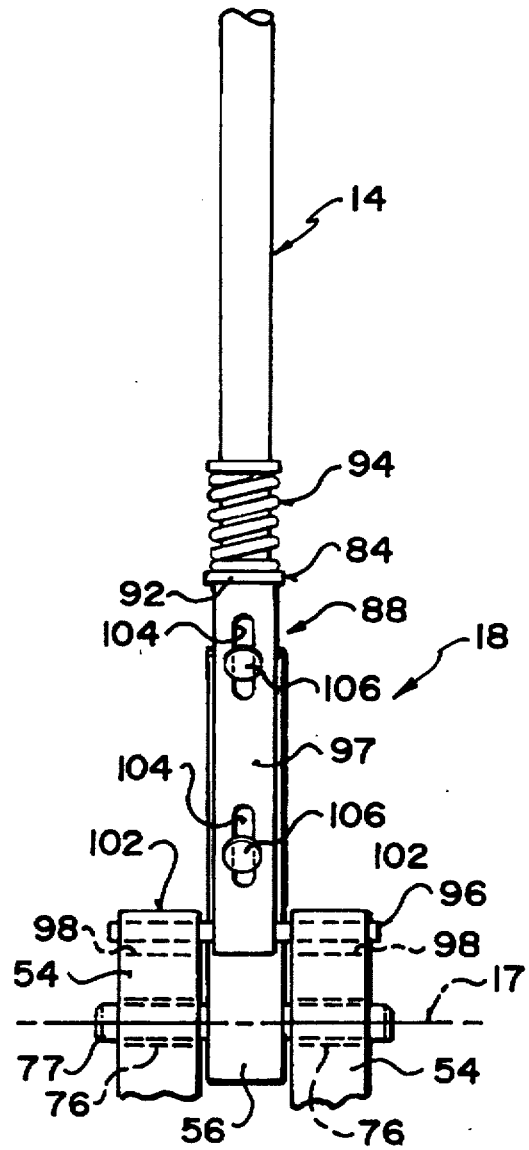
FIG. 4 is a view showing the catch means.

Referring to FIGS. 2 and 4, the catch means 18 allows the user to select one of the selectable shoveling and brushing positions and locks the shovel blade 12 and handle 14 in the selected position. The catch means 18 comprises a collar 84, an elongate catch member 88, a catch handle 92, a resilient means 94, and notches 98 and 100 located in the flanges 54.

The collar 84 is arranged around the handle 14 and is spaced upwards from the shovel blade 12 a distance along the handle 14. The collar 84 is arranged near the top end 60 of the elongate member 56 and around the handle 14 such that it can slide along the handle 14.

The elongate catch member 88 is fixed to the collar 84 at the top end, extends along the handle 14 towards the shovel blade 12, and is arranged between the collar 84 and the shovel blade 12. The elongate catch member 88 comprises a narrow substantially flat plate 97 arranged to lie along the handle 14 at the first end 42 and along the elongate member 56. The catch member 88 includes two slots 104 arranged longitudinally along its length. Two guide members 106 project outwards from the surface of the elongate member 56 on the handle 14 for engaging within the slots 104 of the flat plate 97 thereby guiding the movement of the elongate catch member 88 along the handle 14.

The catch means 18 includes a catch handle 92, for actuating the catch means 18, which is fixed at one end to the collar 84 and extends outwards therefrom. Resilient means 94 are provided for biasing the elongate catch member 88 towards the shovel blade 12. The resilient means 94 comprise a coil spring arranged around the handle 14. The coil spring is fixed at one of its ends to the handle 14 and at the other end to the top of the collar 84.

A pin member 96 is fixed to the bottom end of the elongate catch member 88 and is arranged perpendicular thereto. Two selectable notches 98 and 100 are spaced apart along an upper edge 102 of each of the flanges 54 for receiving the pin member 96. The notches 98 and 100 are arranged such that corresponding notches on the flanges 54 are aligned with each other, forming first and second pairs of aligned notches. The pin member 96 extends laterally through the elongate catch member 88 projecting outwards from opposing sides thereof for engaging the aligned notches 98 and 100. The pin 96 holds the handle 14 and shovel blade 12 in the shoveling position when the pin 96 is in the first pair of aligned notches 98, and holds the handle 14 and shovel blade 12 in the brushing position when the pin 96 is in the second pair of aligned notches 100.

The shovel blade 12 and flanges 54 may be made of a single piece of material or may be of separate pieces of material joined together. The shovel blade 12, scraping edge 32, and flanges 54 may be made of metal, plastics, or any other appropriate material.

While one embodiment of the present invention has been described in the foregoing, it is to be understood that other embodiments are possible within the scope of the invention. The invention is to be considered limited solely by the scope of the appended claims.

I claim:

1. A combined shovel and broom comprising:

a shovel blade having a concave front face, a laterally extending shoveling edge and a laterally extending brush edge;

a brush head along the laterally extending brush edge of the shovel blade;

an elongate handle having a first end and a second end;

pivot connection means pivotally mounting the first end of the handle on the shovel blade for pivotal movement of the handle relative to the blade between a shoveling position with the handle sloping to a front of the blade towards the shoveling edge and a brushing position with the handle sloping to a front of the blade towards the brush edge, said pivot connection means comprising:

an elongate member having a first end, a second end, a receptacle at the second end for receiving the first end of the handle, and a hole arranged adjacent the first end of the elongate member and extending through opposing sides of the elongate member;

a pair of spaced apart flanges fixed to the back side of the shovel blade substantially perpendicular to the shoveling and brush edges for receiving the first end of the elongate member therebetween;

and a pin member extending through the hole in the elongate member and connected at each end to a respective one of the pair of the flanges thereby pivotally connecting the elongate member between the flanges;

and catch means mounted on the handle for selectively locking the handle in one of the shoveling position and the brushing position, said catch means comprising:

a plurality of notches in a top surface of at least one of the flanges;

a collar arranged around the handle for sliding therealong;

an elongate catch member fixed to the collar and extending along the handle towards the shovel blade;

a catch handle for actuating the catch member fixed to the collar and extending outwards therefrom;

and an engagement member fixed adjacent the end of the elongate member and arranged perpendicular thereto for selectively engaging within one of the plurality of notches;

and wherein releasing the catch handle engages the engagement member within a selected one of the plurality of notches;

and wherein applying an upwards force to the catch handle draws the elongate catch member upwards disengaging the engagement member from said one of the plurality of notches.

2. A combined shovel and broom in accordance with claim 1 wherein each one of the pair of spaced apart flanges includes a receptacle for receiving a respective end of the pin member therein, said receptacles being arranged to align with one another and with the hole in the handle.

3. A combined shovel and broom in accordance with claim 1 wherein the pair of spaced apart flanges include reinforcing members, said reinforcing members extending between the flange to the shovel blade.

4. A combined shovel and broom in accordance with claim 1 wherein the shovel blade and flanges are of a single piece of material.

5. A combined shovel and broom in accordance with claim 4 wherein the single piece of material is rigid plastics material.

6. A combined shovel and broom in accordance with claim 1 wherein the shoveling edge includes a scraping edge comprising an elongate metal strip fixed laterally along the shoveling edge.

7. A combined shovel and broom in accordance with claim 1 wherein the plurality of notches comprise two notches spaced apart along an upper edge of at least one of the pair of flanges for selectively receiving the engagement member therein such that when the engagement member is in one of the notches, the shovel blade is held in the shoveling position and when the engagement member is in the other one of the notches, the shovel blade is held in the brushing position.

8. A combined shovel and broom in accordance with claim 1 wherein the plurality of notches are arranged on each of the pair of flanges spaced apart along an upper edge thereof and arranged such that corresponding notches on respective ones of the flanges are aligned with each other, and wherein the engagement member extends through the elongate catch member projecting outwards from opposing sides thereof for engaging said aligned notches.

9. A combined shovel and broom in accordance with claim 1 wherein the catch means include resilient means for biasing the catch means towards the shovel blade.

10. A combined shovel and broom in accordance with claim 9 wherein the resilient means is fixed to the handle at one end and to the collar at the other end.

11. A combined shovel and broom in accordance with claim 9 wherein the resilient means is a coil spring.

12. A combined shovel and broom comprising:

a blade having a laterally extending shoveling edge, a laterally extending brush edge, a concave first face extending between the shoveling and brush edges and a second face opposite the front face;

a brush head along the brush edge;

an elongate handle having a first end and a second end;

pivot connection means pivotally mounting the blade on the first end of the handle for pivotal movement of the blade on the handle, the blade being pivotal between;

an upright shoveling position with the brush edge above the shovelling edge and the handle sloping upwardly from the second face of the blade; and a brushing position with the concave face facing in a downwards direction, the brush edge positioned forwardly of the shovelling edge and the handle sloping upwardly and rearwardly from the second face of the blade;

and catch means for selectively locking the handle in one of the shoveling position and the brushing position.

13. A combined shovel and broom in accordance with claim 12 wherein the blade comprises a rigid plastics material and including an elongate metal strip fixed laterally along the shoveling edge.

14. A combined shovel and broom in accordance with claim 12 wherein the catch means comprise resilient means for normally engaging the catch means and catch release means for selectively releasing the catch means.

* * * * *